Nov. 14, 1939.  H. G. J. VOOGD  2,179,581
WIRE STRIPPER HAND TOOL
Filed June 21, 1937   2 Sheets-Sheet 1
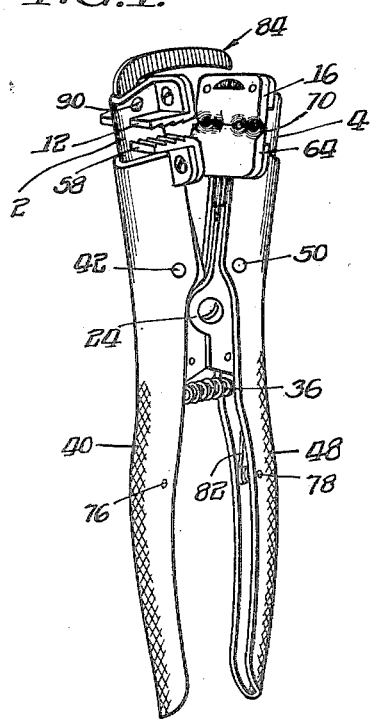
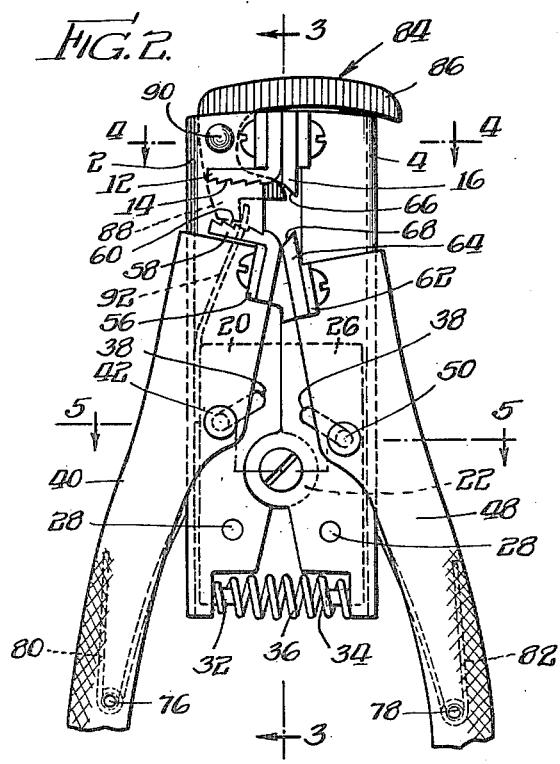
Inventor
Herman Gerhard Jan Voogd
By:- Cox & Moore attys.

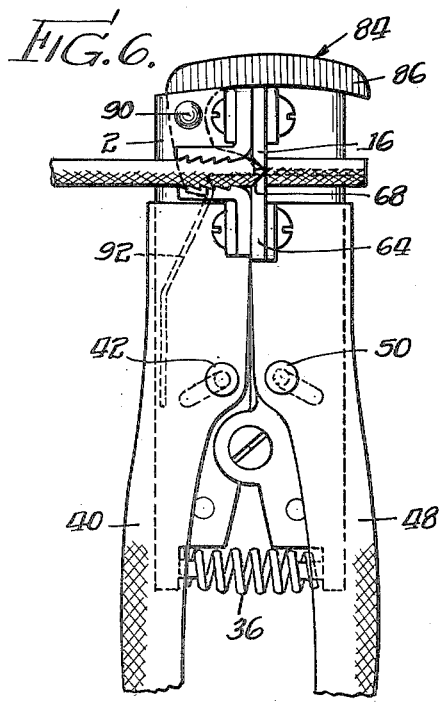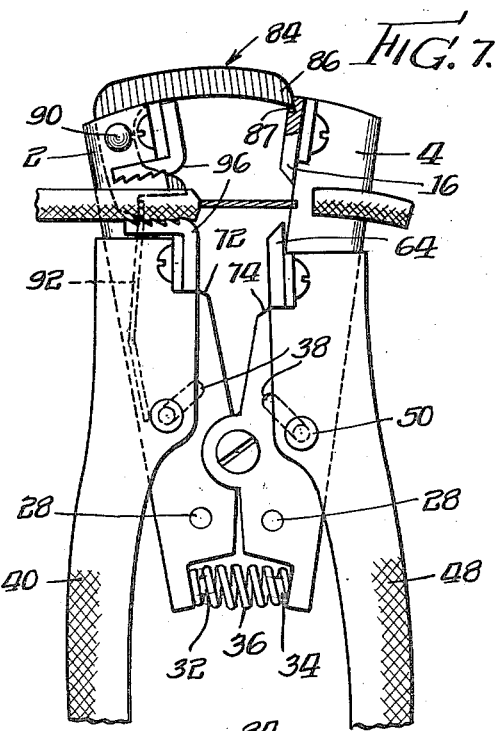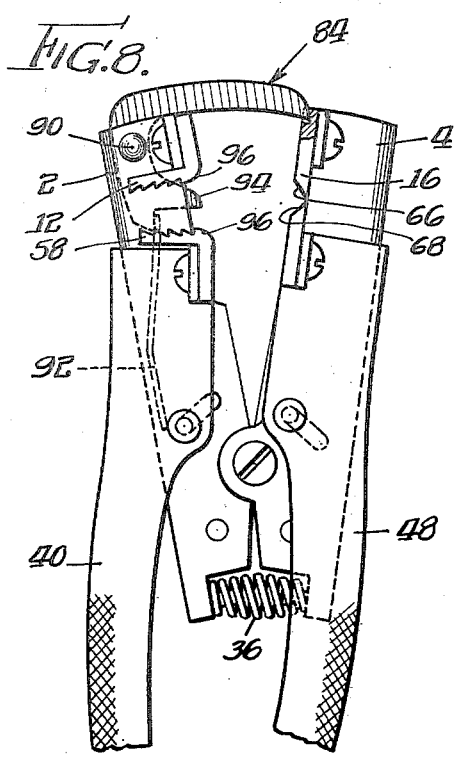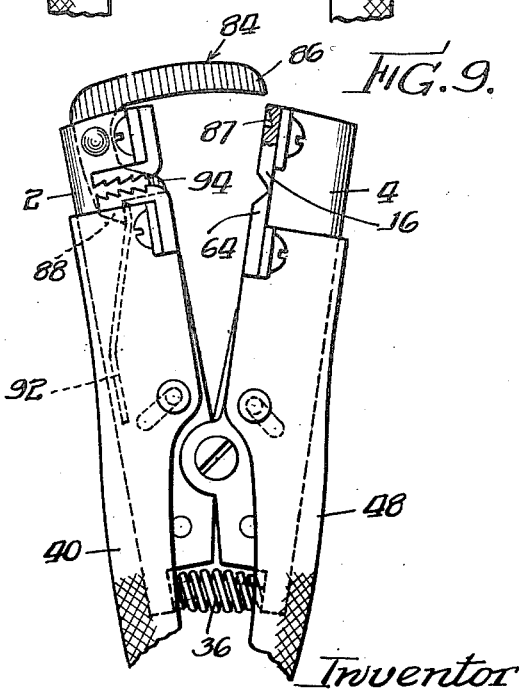

Patented Nov. 14, 1939

2,179,581

UNITED STATES PATENT OFFICE 2,179,581

WIRE STRIPPER HAND TOOL

Herman Gerhard Jan Voogd, Hengelo, Netherlands, assignor to Robert J. Montgomery, Chicago, Ill.

Application June 21, 1937, Serial No. 149,334

8 Claims. (Cl. 81—9.5)

This invention relates to tools for severing and stripping insulation and like covering from electric wires or similar elements.

In the wire stripping tools of the prior art the wire is placed between pairs of relatively movable gripper and stripper jaws to sever the insulation, these pairs of jaws being then moved apart or outwardly relative to each other to strip the insulation from the conductor. In such tools the wire is then held between these jaws during their inward movement, and in so moving the wire and its strands, in the case of stranded wire, are crushed or bent between the closing jaws.

It is an object of this invention to provide a wire stripping tool with means to prevent the tool from crushing the wire or strands.

A further object of the invention is to provide in a wire stripping tool, means for holding the gripping and stripping jaws apart after the wire has been stripped, to prevent crushing of the wire or its strands.

A further, more specific object of the invention is to provide a wire stripping tool of the type disclosed in the patent to Robert J. Montgomery 1,730,980 granted October 8, 1929, with means to prevent closing of the carriers until the wire has been released from the gripping jaws.

Other and further objects and advantages of the invention will be apparent from the description which follows, when taken in connection with the accompanying drawings, wherein:

Fig. 1 is a view in perspective of a wire stripping tool embodying the invention.

Fig. 2 is a fragmentary, vertical elevation showing the assembly of the several parts of the tool.

Fig. 3 is a vertical section taken along the line 3—3 of Fig. 2.

Fig. 4 is a horizontal section taken along the line 4—4 of Fig. 2.

Fig. 5 is a horizontal section taken along the line 5—5 of Fig. 2.

Figs. 6, 7, 8 and 9 are views in elevation showing the operation of the stripping tool.

Referring to the drawings, 2 and 4 designate a pair of opposed jaw carriers, each of U shape in cross section, as clearly shown in Figs. 4 and 5, with the inner open edges directed toward each other. The jaw carrier 2 is provided with integral, oppositely directed lugs 6 and 8, upon which is secured by means of bolts 10 an upper gripper jaw 12 having a serrated gripping face 14. The jaw carrier 4 is provided with a similar pair of oppositely directed, transverse lugs 12' and 14', upon which is secured an upper stripping jaw or blade 16 by means of screws 18. A filler strip 20 lies within the jaw carrier 2 and is provided on its inner edge with a projecting hinge lug 22 that lies between hinge lugs 24 formed integrally with the jaw carrier 4. A similar filler strip 26 is mounted in the lower end of the jaw carrier 4 and is provided with a cut-out portion receiving the hinge lug 22 of the filler 20. The filler strips 20 and 26 are secured to the jaw carriers by means of rivets 28 and the hinge lugs 22 and 24 are united by a pivot bolt 30. The filler strips 20 and 26 carry at their inner ends inwardly extending lugs 32 and 34 which receive and center a spring 36, the spring 36 normally urging the jaw carriers toward closed position as shown in Fig. 2. A cam slot 38 is formed in each of the jaw carriers 2 and 4 at points slightly above and outwardly of the pivot bolt 30, each of the slots extending through the carrier and its associated filler.

A handle lever 40 is pivotally and slidably connected to the jaw carrier 2 by means of a roller or pin 42 which passes through the cam slot 38 and is secured against movement transversely of the handle by an enlarged head 44 and cotter pin or key 46. A similar handle lever 48 is pivotally and slidably connected to the jaw carrier 4 by means of a similar roller or pin 50 passing through the cam slot 38 in the jaw carrier 4 and the pin is secured against movement transversely of the handle lever 48 by its enlarged head 52 and a cotter pin or key 54.

The handle lever 40 carries at its outer end a pair of integrally formed transverse lugs 56 similar to the lugs 6 and 8, and to these lugs is secured in a similar manner a lower gripper jaw 58 having a similarly serrated face 60. The handle lever 48 is similarly provided with a pair of transverse lugs 62 to which is secured a lower stripper blade or jaw 64. The stripper blades or jaws 16 and 64 are provided with oppositely and outwardly tapering cutting surfaces 66 and 68 and a plurality of alined small cutting notches 70 to accommodate different sizes of wire.

It will be observed that the lower jaws 58 and 64, carried by the handle levers 40 and 48, extend across the inner edges of the jaw carriers 2 and 4 as shown in Figs. 3 and 4 and these inner edges of the jaw carrier are cut away to provide shoulders 72 and 74 (Fig. 7) which cooperate with the intermediate portions of the lower edges of the jaws 58 and 64 to limit the retracting movement of the handle levers 40 and 48.

Mounted on pins 76 and 78 in the handle levers 40 and 48 are a pair of coil springs 80 and 82, the shorter ends of which bear against the handle levers and the longer ends of which slidably engage the outer edges of the jaw carriers 2 and 4 and normally urge the handle levers away from and downwardly of the jaw carriers.

To prevent crushing of the strands means are provided to retain the jaw carriers 2 and 4 in opened position during the downward retracting movements of the handle levers 40 and 48 to release the stripped conductor from the gripping and stripper jaws. In the embodiment shown in the drawings this means comprises a dog or bell crank 84 having an arcuate locking arm 86 and a downwardly extending operating arm 88. The locking dog is pivoted to the jaw carrier 2 adjacent its upper edge by means of a pin or rivet 90 passing through the jaw carrier and the operating arm 88 of the dog. The dog is normally urged into locking position by means of a spring strip 92 engaging the lower end of the arm and seating between the filler 20 and the jaw carrier 2 as best shown in Figs. 2 and 5. The operating arm 88 of the dog is provided with a laterally extending lug 94, the lower edge of which is alined with the cutting edge of the upper stripper jaw. This lug extends into the space provided by the curved edges 96 of the gripper jaws and the beveled cutting surfaces 66 and 68 of the stripping jaws and passes through notches 98 and 100 in the gripper jaws, as best shown in Fig. 3.

The operation of the tool is as follows: The wire to be stripped is laid between the outer and inner pairs of gripping and stripping jaws and is seated in whichever pair of cutting notches is suited to the size of the wire. The handle levers 40 and 48 are then squeezed together. The first part of the squeezing movement causes the handle levers 40 and 48 to move upwardly due to the thrust of the pins 42 and 50 on the inclined sides of the cam slots 38, the other ends of the handle levers being prevented from swinging outwardly relative to the jaw carriers by reason of the bearing of the jaws 58 and 64 on the inner edges of the jaw carriers and the jaw carriers being prevented from moving outwardly during this upward movement of the handle levers by the spring 36. The wire is thus gripped between the jaws 12 and 58 and the insulation is simultaneously cut by the jaws 16 and 64, as shown in Fig. 6.

During further squeezing of the handle the jaw carriers are moved outwardly about their pivot 30 against the force of the spring 36, thus stripping the severed portion of the insulation from the wire. If, as in the prior art device, the jaw carriers now move toward each other immediately upon the release of the handle levers, the frictional drag of the edges of the severing notches in the stripper jaws exerted on the bared portion of the wire (the wire being still gripped by the gripping jaws) causes a crushing, bending or twisting of the wire or the wire strands. If, as frequently occurs, the bared portion of the wire, because of its flexibility, becomes misalined with respect to the severing notches of the stripping jaws, this crushing, bending and twisting of the wire as the stripping jaws move toward the gripping jaws (in which the wire is still clamped) is accentuated. According to the present invention, however, as the jaw carriers and handle levers are moved outwardly to strip the insulation, and as soon as the jaw carrier 4 passes beyond the end of the locking arm 86 of the dog 84, the spring 92 causes the dog to rotate in a clockwise direction, as shown in Figs. 2 and 6, and inwardly of the upper edge of the stripping blade 16. Immediately upon release of the handle levers, the notch 87 of the stripping jaw 16 is engaged by the locking arm 86 and the closing of the jaw carriers 2 and 4 is thereby prevented. Under the action of the releasing springs 80 and 82, the handle levers 40 and 48 are moved downwardly and outwardly relative to the jaw carriers 2 and 4 and the wire is thereby released from the gripping and stripping jaws, as shown in Fig. 7, before the stripping jaws are freed for movement toward the gripping jaws. The stripped wire having been removed from the tool, the handle levers 40 and 48 are again squeezed to cause said levers to move upwardly of the jaw carriers, and in so moving the lower edge of the notch 100 in the gripping jaw 58 engages the lower edge of the lug 94 and moves the same upwardly into the recess 98 in the gripping jaw 12. This upward movement of the lug 94 causes the dog 84 to be rotated in a counterclockwise direction, as seen in Fig. 2, to lift the locking arm 86 out of the recess 87 in the upper edge of the carrier 4. Upon subsequent release of the handles 40 and 48 the parts are returned to their original positions by the springs 36, 80 and 82.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. A wire stripping tool comprising in combination a pair of pivoted jaw carriers having wire clamping and stripping jaws mounted thereon, means urging said jaw carriers toward each other, handle levers slidable endwise on said carriers and equipped with clamping and stripping jaws adapted to cooperate with said first named clamping and stripping jaws, means connecting said handle levers to said carriers to first advance said handle levers lengthwise of said carriers and close said jaws on the wire inserted between them, and then spread said carriers thereby moving said clamping jaws away from said stripping jaws to strip the wire, and means for thereafter preventing movement of said carriers toward each other under the action of the urging means until the stripped wire has been removed from said clamping jaws.

2. A wire stripping tool comprising in combination a pair of shiftable jaw carriers having wire clamping and stripping jaws mounted thereon, means urging said jaw carriers toward each other, means slidable endwise on said carriers and having clamping and stripping jaws adapted to cooperate with said first named clamping and stripping jaws, means connecting said last mentioned means to said carriers to close said jaws on a wire inserted between them and then spread said carriers apart to strip said wire, and automatically operable means for thereafter preventing closing of said carriers until the wire has been released by said clamping and stripping jaws.

3. A wire stripping tool, comprising in combination opposed jaw carriers of U-shape cross section pivotally connected at their adjacent edges and formed with laterally extending lugs on their outer ends, wire clamping and stripping jaws respectively attached to the lugs of said carriers and lying crosswise of the inner edges of the latter, a pair of handle levers respectively embracing the outer edges and sides of said carriers and formed with lateral lugs on their outer ends, cooperating clamping and stripping jaws attached to the lugs of said handle levers crosswise of the latter and extending across the inner edges of said carriers, means for mounting said handle levers on said carriers with capacity of combined sliding and pivotal movement, a spring normally urging said cariers to closed position, springs between said handle levers and carriers tending to retract said handle levers, and a spring pressed dog carried by one of said jaw carriers and automatically engaging the other of said carriers when said wire has been stripped to prevent closing of said clamping and stripping jaws until the wire has been removed from said clamping jaws.

4. A wire stripping tool, comprising in combination a pair of jaw carriers pivoted to each other intermediate their outer and inner ends, and formed with cam slots therein, wire clamping and stripping jaws rigidly mounted on the outer ends of said carriers respectively, a thrust spring between the inner ends of said carriers, a pair of handle levers having U-shaped portions embracing and slidable on said carriers, pins extending through the sides of said U-shaped portions and the slots of said carriers, clamping and stripping jaws rigidly mounted on the ends of said U-shaped portions for cooperating with said first-named clamping and stripping jaws, springs between said handle levers and carriers operative to retract said handle levers and withdraw the jaws carried thereby from said first-named jaws, and means for restraining the closing movement of said jaw carriers under action of the first mentioned spring until the stripped wire has been released by the clamping jaws.

5. A wire stripping tool, comprising in combination opposed jaw carriers pivotally connected at their inner edges between their outer and inner ends and formed with cam slots, wire clamping and stripping jaws mounted crosswise of the outer ends of said carriers respectively, handle levers slidably embracing said carriers, pins in said handle levers engaged with said cam slots, wire clamping and stripping jaws mounted crosswise of the outer ends of said handle levers and extending across the inner edges of said carriers, a thrust spring between the inner ends of said carriers, springs mounted on said handle levers and slidably bearing on the outer edges of said carriers for retracting and spreading said handle levers, and a spring pressed dog carried by one of said jaw carriers and automatically engaging the other of said carriers when said wire has been stripped to prevent closing of said clamping and stripping jaws until the wire has been released by said clamping jaws.

6. A wire stripping tool, comprising in combination opposed jaw carriers of U-shaped cross section, the side walls of one of said carriers having apertured hinge lugs and the side walls of the other carrier having notches interfitting with said hinge lugs, a filler strip in said last-named carrier having an apertured hinge lug disposed between said first-named hinge lugs, a pivot pin extending through said hinge lugs, handle levers slidably mounted on said carriers, wire clamping and stripping jaws respectively mounted on the outer ends of said carriers, cooperating wire clamping and stripping jaws mounted on the outer ends of said handle levers, means connecting said handle levers to said carriers serving, when said handle levers are squeezed together, to first advance said handle levers lengthwise of said carriers and close said jaws on a wire inserted between them, and then spread said carriers, and a spring pressed dog carried by one of said jaw carriers and automatically engaging the other of said carriers when said wire has been striped to prevent closing of said clamping and stripping jaws until the wire has been released by said clamping jaws.

7. A wire stripping tool comprising in combination a pair of clamping jaws and a pair of stripping jaws, means for moving the jaws of each pair toward each other to grip the wire to be stripped, means normally urging said pairs of jaws toward each other, means for moving said pairs of jaws apart to strip the wire, and means for preventing movement of said pairs of jaws toward each other under the action of said urging means until the stripped wire has been released by said pair of clamping jaws.

8. A wire stripping tool comprising in combination opposed jaw carriers, clamping and stripping jaws carried by said carriers, means for moving said carriers apart to strip the wire in said clamping and stripping jaws, means urging said jaw carriers toward each other, and means for restraining movement of said carriers toward each other under the action of said urging means until the stripped wire has been released by said clamping jaws.

HERMAN GERHARD JAN VOOGD.